US010850996B2

(12) United States Patent
Nelson

(10) Patent No.: US 10,850,996 B2
(45) Date of Patent: Dec. 1, 2020

(54) PROCESS FOR MANUFACTURING A SOLUTION OF AN EARTH ALKALI HYDROGEN CARBONATE

(71) Applicant: Omya International AG, Oftringen (CH)

(72) Inventor: Nicholas Charles Nelson, Zurich (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 15/540,361

(22) PCT Filed: Jan. 26, 2016

(86) PCT No.: PCT/EP2016/051510
§ 371 (c)(1),
(2) Date: Jun. 28, 2017

(87) PCT Pub. No.: WO2016/120238
PCT Pub. Date: Aug. 4, 2016

(65) Prior Publication Data
US 2018/0002205 A1    Jan. 4, 2018

Related U.S. Application Data

(60) Provisional application No. 62/112,224, filed on Feb. 5, 2015.

(30) Foreign Application Priority Data

Jan. 29, 2015    (EP) .................................... 15153130

(51) Int. Cl.
C02F 1/66    (2006.01)
C02F 1/68    (2006.01)
(Continued)

(52) U.S. Cl.
CPC ............... C02F 1/66 (2013.01); C01B 32/60 (2017.08); C01F 11/18 (2013.01); C02F 1/68 (2013.01);
(Continued)

(58) Field of Classification Search
CPC .. C01F 11/181; C01F 5/24; C02F 1/44; C02F 1/52; C02F 1/66; C02F 1/68; C01B 32/60
See application file for complete search history.

(56) References Cited

U.S. PATENT DOCUMENTS 5,914,046 A    6/1999 Watten
7,374,694 B2    5/2008 Gaudinot et al.
(Continued)

FOREIGN PATENT DOCUMENTS

CN    104080740 A    10/2014
EP    0520826 A1    12/1992
(Continued)

OTHER PUBLICATIONS

Weast et al. "CRC handbook of chemistry and physics: a ready-reference book of chemical and physical data, Passage." CRC Press, Inc., Jan. 1, 1988, XP002661543.
(Continued)

Primary Examiner — Richard M Rump
(74) Attorney, Agent, or Firm — Fay Sharpe LLP

(57) ABSTRACT

The present invention relates to a process for the preparation of an aqueous solution comprising at least one earth alkali hydrogen carbonate, a process for the mineralization of water as well as the use of an aqueous solution comprising at least one earth alkali hydrogen carbonate obtained by the process for the mineralization of water.

25 Claims, 2 Drawing Sheets

Figure 1:
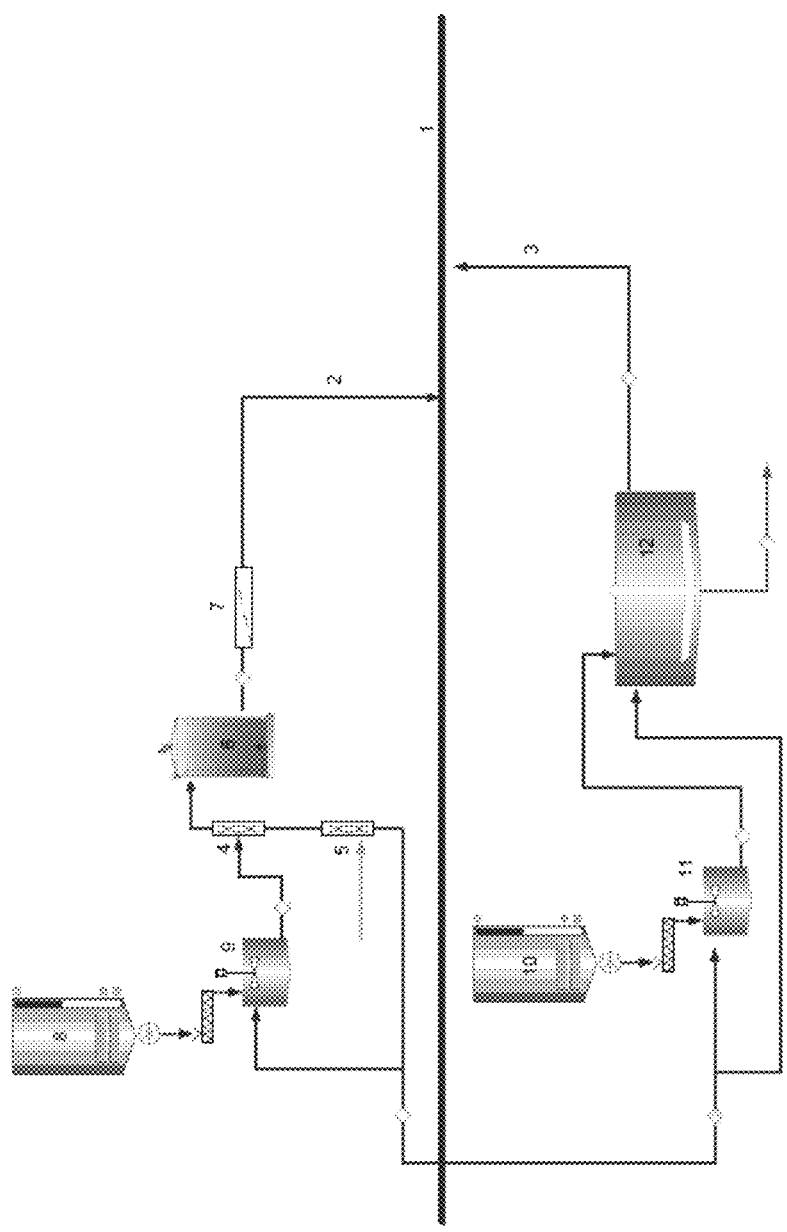

(51) Int. Cl.
*C01B 32/60* (2017.01)
*C01F 11/18* (2006.01)

(52) U.S. Cl.
CPC .......... *C02F 1/686* (2013.01); *C02F 2209/06* (2013.01); *C02F 2301/043* (2013.01)

(56) References Cited

U.S. PATENT DOCUMENTS

| | | | |
|---|---|---|---|
| 7,771,599 B1 | 8/2010 | Choi et al. | |
| 2004/0020410 A1 | 2/2004 | Gane et al. | |
| 2004/0104180 A1* | 6/2004 | Gaudinot | A23L 2/54 210/749 |
| 2009/0010827 A1 | 1/2009 | Geerlings et al. | |
| 2014/0209544 A1 | 7/2014 | Poffet et al. | |
| 2014/0360940 A1 | 12/2014 | Buri et al. | |
| 2015/0010458 A1 | 1/2015 | Buri et al. | |

FOREIGN PATENT DOCUMENTS

| | | |
|---|---|---|
| EP | 1974806 A1 | 10/2008 |
| EP | 1974807 A1 | 10/2008 |
| EP | 1978310 A1 | 10/2008 |
| EP | 1982759 A1 | 10/2008 |
| EP | 2565165 A1 | 3/2013 |
| EP | 2623466 A1 | 8/2013 |
| EP | 2623467 A1 | 8/2013 |
| EP | 2623564 A1 | 8/2013 |
| EP | 2805923 A1 | 11/2014 |
| GB | 2499992 A | 9/2013 |
| RU | 2533143 A | 11/2014 |
| WO | 0039222 A1 | 7/2000 |
| WO | 2004083316 A1 | 9/2004 |
| WO | 2010023742 A1 | 3/2010 |
| WO | 2012020056 A1 | 2/2012 |
| WO | 2012113957 A1 | 8/2012 |
| WO | 2013014026 A1 | 1/2013 |
| WO | 2013132399 A1 | 9/2013 |
| WO | 2014187613 A1 | 11/2014 |
| WO | 2014187666 A1 | 11/2014 |

OTHER PUBLICATIONS

International Search Report dated Apr. 5, 2016 for PCT/EP2016/051510.
Written Opinion of the International Searching Authority dated Apr. 5, 2016 for PCT/EP2016/051510.
EPO, Extended European Search Report and Annex, in related European patent application No. EP15153130.8, dated Jul. 9, 2015, 5 pages.
EPO, Office Action, in related European patent application No. EP15153130.8, dated Jun. 8, 2017, 5 pages.
EPO, Office Action, in related European patent application No. EP15153130.8, dated Jan. 5, 2018, 5 pages.
WO, International Preliminary Report on Patentability, in related international patent cooperation treaty application No. PCT/EP2016/051510 , dated Aug. 1, 2017, 6 pages.
IPAU, Examination Report No. 1 for Standard Patent Application, in related Australian patent application No. 2016212180, dated Jun. 18, 2018, 3 pages.
CIPO, Office Action, in related Canadian patent application No. 2,972,687, dated Aug. 31, 2018, 4 pages.
Rospatent, Search Report, in related Russian patent application No. 2017130269, dated Jun. 19, 2018, 2 pages.
Rospatent, Office Action, in related Russian patent application No. 2017130269, dated Jun. 19, 2018, 7 pages.
Rospatent, Decision to Grant, in related patent application No. 2017130269, dated Nov. 20, 2018, 18 pages.
SIPOPRC, Search Report and Office Action, in related Chinese patent application No. 201680007643.6, dated Jul. 23, 2018, 17 pages.
TIPO, Search Report and Examination Report, in related Taiwanese patent application No. 105102329, dated Nov. 3, 2016, 6 pges.
TIPO, Decision to Grant, in related Taiwanese patent application No. 105102329, dated Jun. 13, 2017, 3 pages.
KIPO, Search Report and Office Action, in related Korean patent application No. 10-2017-7024251, dated Oct. 29, 2018, 25 pages.

* cited by examiner

PROCESS FOR MANUFACTURING A SOLUTION OF AN EARTH ALKALI HYDROGEN CARBONATE

CROSS-REFERENCE TO RELATED APPLICATIONS

This is a U.S. national phase of PCT Application No. PCT/EP2016/051510, filed Jan. 26, 2016, which claims priority to European Application No. 15153130.8, filed Jan. 29, 2015 and U.S. Provisional Application No. 62/112,224, filed Feb. 5, 2015.

The present invention relates to a process for the preparation of an aqueous solution comprising at least one earth alkali hydrogen carbonate, a process for the mineralization of water as well as the use of an aqueous solution comprising at least one earth alkali hydrogen carbonate obtained by the process for the mineralization of water.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of sea water, brine, brackish waters, waste waters and contaminated effluent waters is gaining more and more importance for environmental and economic reasons.

In order to recover water from sea water or brackish water, for potable usages, several processes are known, which are of considerable importance for dry areas, coastal regions and marine islands, and such processes usually comprise distillation, electrolytic as well as osmotic or reverse osmotic processes. The water obtained by such processes is very soft and has a low pH value because of the lack of pH-buffering salts, and thus, tends to be highly reactive and, unless treated, it can create severe corrosion difficulties during its transport in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to mineralize the water.

Conventional processes that are mainly used for the mineralization of water are lime dissolution by carbon dioxide and limestone bed filtration, also called calcite contactors. Other, less common mineralization processes, comprise, e.g., the addition of hydrated lime and sodium carbonate, the addition of calcium sulphate and sodium hydrogen carbonate, or the addition of calcium chloride and sodium hydrogen carbonate.

The lime process involves treatment of lime solution with $CO_2$ acidified water, wherein the following reaction is involved:

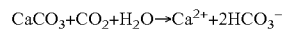

$$Ca(OH)_2 + 2CO_2 \rightarrow Ca^{2+} + 2HCO_3^-$$

As can be gathered from the above reaction scheme, two equivalents of $CO_2$ are necessary to convert one equivalent of $Ca(OH)_2$ into $Ca^{2+}$ and hydrogen carbonate for mineralization. This method is dependent on the addition of two equivalents of $CO_2$, in order to convert the alkaline hydroxide ions into the buffering species $HCO_3^-$. For the mineralization of water, a saturated calcium hydroxide solution, commonly named lime water, of 0.1-0.2 wt.-%, based on the total weight, is prepared from a lime milk (usually at most 5 wt.-%). Therefore, a saturator to produce the lime water must be used and large volumes of lime water are necessary to achieve the target level of mineralization. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing soft water through a bed of granular limestone dissolving the calcium carbonate in the water flow. Contacting limestone with $CO_2$ acidified water mineralizes the water according to:

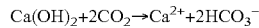

$$CaCO_3 + CO_2 + H_2O \rightarrow Ca^{2+} + 2HCO_3^-$$

Unlike the lime process, only one equivalent of $CO_2$ is stoichiometrically necessary to convert one equivalent of $CaCO_3$ into $Ca^{2+}$ and hydrogen carbonate for mineralization. Moreover, limestone is not corrosive and due to the buffering properties of $CaCO_3$ major pH shifts are prevented. However, as the pH increases the reaction slows down such that additional $CO_2$ has to be dosed in order to ensure enough $CaCO_3$ is dissolved. The unreacted $CO_2$ is then either removed through stripping or neutralization with sodium hydroxide.

Methods and systems for mineralization of water using lime milk or a slurry of lime are described in U.S. Pat. No. 7,374,694 and EP 0 520 826. U.S. Pat. No. 5,914,046, which describes a method for reducing the acidity in effluent discharges using a pulsed limestone bed.

U.S. Pat. No. 7,771,599 describes a method for the mineralization of process water in a desalination system. The method sequesters carbon dioxide gas from sea water or concentrate (brine) of the desalination process via a gas transfer membrane. The sequestered carbon dioxide gas is thereafter used in the production of soluble calcium hydrogen carbonate $(Ca(HCO_3)_2)$. WO 2012/020056 A1 is directed toward a process for mineralization of water comprising the steps of providing feed water, and injecting gaseous carbon dioxide and a slurry into the feed water, wherein the slurry comprises micronized calcium carbonate. WO 2010/023742 A2 describes a method and apparatus for producing potable water by post-processing (post-treating) desalinated water obtained by desalination of sea water through distillation or reverse osmosis. The method includes a carbon dioxide absorption process of excessively supplying carbon dioxide into the desalinated water to absorb the carbon dioxide, a mineralization process of passing the desalinated water into which carbon dioxide is absorbed through a limestone filter in which limestone is filled to form calcium ions and hydrogen carbonate ions, and a carbon dioxide exhaust process of supplying air into the desalinated water passed through the mineralization process to exhaust the carbon dioxide with the air to obtain the potable water. WO 2012/113957 A1 relates to a method for the remineralisation of fluids, in which final turbidity is controlled. The method includes steps comprising reagent dosing, remineralisation and filtration. EP 2565165 A1 refers to a process for mineralization of water comprising the steps of providing feed water, providing an aqueous solution of calcium carbonate, wherein the aqueous solution of calcium carbonate comprises dissolved calcium carbonate and reaction species thereof, and combining the feed water and the aqueous calcium carbonate solution. EP 2623466 A1 refers to a process for the preparation of an aqueous solution comprising at least one earth alkali hydrogen carbonate and its uses. The process may be carried out in a reactor system comprising a tank equipped with a stirrer, at least one filtering device and a grinding device. EP 2623467 A1 refers to a process for the preparation of an aqueous solution comprising at least one earth alkali hydrogen carbonate and its uses. The process is carried out in a reactor system that comprises a tank equipped with a stirrer and at least one filtering device. EP 2623564 A1 relates to an installation for the purification of minerals, pigments and/or fillers and/or the preparation of precipitated earth alkali carbonate and/or mineralization of water and to the use of such an installation for the purification of minerals, pigments and/or fillers and/or mineralization of water and/or the preparation of precipitated earth alkali carbonate. WO 2013/132399 A1 refers to water mineralization which is carried out by mixing carbonate in powder form in a fast process into the water, generating $CO_2$ in the water but adding turbidity to it. The treated water is then delivered through a reactor with granular carbonate, in which the $CO_2$ in the water dissolves additional carbonate in a slow process. The reactor acts simultaneously to add further minerals as well as alkalinity to the water, and to remove the turbidity out of the water by dissolving residual powder and filtering non-dissolvable particles. CN 102826689 A1 refers to a post-treatment process of desalted seawater, comprising the following steps of: (1) adding $CO_2$ into seawater desalted water and sufficiently mixing; and (2) mineralizing the seawater desalted water added with the $CO_2$ in a mineralizing pool; arranging a calcium carbonate filler bed in the mineralizing pool; and enabling the seawater desalted water added with the $CO_2$ to pass through the calcium carbonate filler bed to be sufficiently contacted and reacted with calcium carbonate. WO 2013/014026 A1 concerns a process for treating water and the use of calcium carbonate in such a process. In particular, it is directed to a process for remineralization of water comprising the steps of (a) providing feed water having a concentration of carbon dioxide of at least 20 mg/l, preferably in a range of 25 to 100 mg/l, and more preferably in a range of 30 to 60 mg/l, (b) providing an aqueous slurry comprising micronized calcium carbonate, and (c) combining the feed water of step (a) and the aqueous slurry of step (b) in order to obtain remineralized water. WO 2014/187666 A1 refers to a multiple batch system for the preparation of a solution of calcium hydrogen carbonate and the use of such a dual batch system for the preparation of a solution of calcium hydrogen carbonate. WO 2014/187613 A1 relates to an installation for the preparation of a solution of calcium hydrogen carbonate and the use of such an installation for the continuous preparation of a solution of calcium hydrogen carbonate as well as the use of such an installation for the remineralization of water.

However, the described processes have the disadvantage that the mineralization of water and especially the preparation of an aqueous solution comprising at least one earth alkali hydrogen carbonate used for the mineralization of water show an inefficient $CO_2$ consumption, which is often resolved by stripping excess $CO_2$ once again from the process and venting to the atmosphere, or excessive $CO_2$ consumption in case of the lime system.

In view of the foregoing, improving the mineralization of water still remains of interest to the skilled man. It would be especially desirable to provide an alternative or improved process for the preparation of an aqueous solution comprising at least one earth alkali hydrogen carbonate which can be prepared in a more efficient, economic and ecologic way, especially enabling an increase in the efficiency of $CO_2$ consumption for the process, while decreasing the sludge production and overall costs for the installation and operation.

It is thus an object of the present invention to provide a process for the preparation of an aqueous solution comprising at least one earth alkali hydrogen carbonate. Another object may also be seen in the provision of a process for the preparation of an aqueous solution comprising at least one earth alkali hydrogen carbonate that increases the efficiency of $CO_2$ consumption for the process. A further object may be seen in the provision of a process for the preparation of an aqueous solution comprising at least one earth alkali hydrogen carbonate in which the sludge production is decreased compared to a typical lime system of the prior art. A further object may be seen in the provision of a process for the preparation of an aqueous solution comprising at least one earth alkali hydrogen carbonate enabling a decrease in overall costs for the installation and operation of the mineralization process.

One or more of the foregoing and other problems are solved by the subject-matter as defined herein in the independent claims. Advantageous embodiments of the present invention are defined in the corresponding sub-claims.

A first aspect of the present invention relates to a process for the preparation of an aqueous solution comprising at least one earth alkali hydrogen carbonate. The process comprises the steps of:
  a) providing water in a main process flow (1) and in at least one side process flow (2);
  b) adding at least one earth alkali carbonate-comprising material to the water provided in a first portion (4) of the side process flow (2) to obtain a suspension comprising the at least one earth alkali carbonate-comprising material;
  c) adding carbon dioxide or an acid having a $pK_a$-value<5 to the water provided in a second portion (5) of the side process flow (2) and adjusting the pH-value to a range from 2.5 to 7.5 to obtain acidified water;
  d) combining the suspension obtained in step b) with the acidified water obtained in step c) to obtain a solution or suspension of at least one earth alkali hydrogen carbonate;
  e) dosing the solution of at least one earth alkali hydrogen carbonate obtained in step d) into the water provided in the main process flow (1) to obtain an aqueous solution of at least one earth alkali hydrogen carbonate; and
  f) adding at least one earth alkali hydroxide provided in water to the aqueous solution of at least one earth alkali hydrogen carbonate obtained in the main process flow (1) of step e) to adjust the pH-value of the aqueous solution of at least one earth alkali hydrogen carbonate to a range from 7.0 to 9.0 and to form an aqueous solution of at least one earth alkali hydrogen carbonate having an earth alkali concentration as earth alkali hydrogen carbonate in the range from 10 to 300 mg/l;
  wherein the molar ratio between the at least one earth alkali carbonate-comprising material in step b) and the at least one earth alkali hydroxide in step f) is in the range from 50:1 to 1:10.

According to a further aspect of the present invention, a process for the mineralization of water is provided, the process comprises the steps of
  i) providing water to be mineralized,
  ii) providing an aqueous solution comprising at least one earth alkali hydrogen carbonate obtained by the process, as defined herein,
  iii) combining the water to be mineralized of step i) and the aqueous solution comprising at least one earth alkali hydrogen carbonate of step ii) in order to obtain mineralized water, and iv) adding at least one earth alkali hydroxide to the mineralized water obtained in step iii).

According to another aspect of the present invention, the use of an aqueous solution comprising at least one earth alkali hydrogen carbonate obtained by the process, as described herein, for the mineralization of water is provided. According to one embodiment of the present use, the water is desalinated or naturally soft water.

According to one embodiment of the present process, the at least one earth alkali carbonate-comprising material in step b) is selected from the group consisting of precipitated calcium carbonate, modified calcium carbonate, ground calcium carbonate and mixtures thereof, preferably the at least one earth alkali carbonate-comprising material in step b) is ground calcium carbonate.

According to another embodiment of the present process, the at least one earth alkali carbonate-comprising material in step b) is selected from the group consisting of marble, limestone, chalk and mixtures thereof.

According to yet another embodiment of the present process, the at least one earth alkali carbonate-comprising material in step b) is added in dry form or in aqueous form and/or the at least one earth alkali hydrogen carbonate obtained in step d) comprises calcium hydrogen carbonate and preferably consists of calcium hydrogen carbonate and/or the earth alkali hydroxide added in step f) comprises calcium hydroxide and preferably consists of calcium hydroxide and/or the acid in step c) has a $pK_a$-value<4 and/or the acid in step c) is selected from the group consisting of sulphuric acid, hydrochloric acid, nitric acid or citric acid and mixtures thereof.

According to one embodiment of the present process, the second portion (5) of the side process flow (2) is located before the first portion (4) of the side process flow (2).

According to another embodiment of the present process, combining step d) is carried out in a reactor unit (6), preferably a tank or a tube reactor, and/or the solution or suspension of at least one earth alkali hydrogen carbonate obtained in step d) is subjected to a separation step g) in separation unit (7), preferably the separation step g) is carried out by passing the solution or suspension of at least one earth alkali hydrogen carbonate through a filter, a membrane or a filter bed or by centrifuging the solution or suspension of at least one earth alkali hydrogen carbonate.

According to yet another embodiment of the present process, the pH-value in step c) is adjusted to the range from 3.0 to 7.0 and preferably to the range from 4.0 to 5.0 and/or the pH-value in step e) is adjusted to the range from 5.5 to 7.5 and preferably to the range from 6.0 to 7.0.

According to one embodiment of the present process, the aqueous solution of at least one earth alkali hydrogen carbonate obtained in step f) has an earth alkali concentration as earth alkali hydrogen carbonate in the range from 20 to 200 mg/l and preferably from 50 to 120 mg/l.

According to another embodiment of the present process, the molar ratio between the at least one earth alkali carbonate-comprising material in step b) and the earth alkali hydroxide in step f) is in the range from 50:1 to 1:3, preferably from 3:1 to 1:1.5.

According to yet another embodiment of the present process, the suspension comprising the at least one earth alkali carbonate-comprising material obtained in step b) has a solids content in the range from 0.01 to 20.0 wt.-%, preferably in the range from 1.0 to 15.0 wt.-% and more preferably in the range from 5.0 to 10.0 wt.-%, based on the total weight of the suspension.

According to one embodiment of the present process, the solution or suspension of at least one earth alkali hydrogen carbonate obtained in step d) has an earth alkali metal concentration as earth alkali hydrogen carbonate in the range from 100 to 1 000 mg/l and preferably in the range from 300 to 600 mg/l, and/or the concentration of the at least one earth alkali hydroxide in the water of step f) is in the range from 800 to 1 700 mg/l and preferably in the range from 1 000 to 1 300 mg/l and/or the at least one earth alkali hydroxide as provided in step f) is in form of a solution generated on site, preferably the solution has an earth alkali hydroxide content from 0.05 wt.-% to 0.4 wt.-%, preferably about 0.1 wt.-%, based on the total weight of the solution, or the at least one earth alkali hydroxide as provided in step f) is in form of a suspension having an earth alkali hydroxide content from 15.0 to 25.0 wt.-%, preferably about 20.0 wt.-%, based on the total weight of the suspension.

According to another embodiment of the present process, the at least one earth alkali hydroxide in the form of a solution is provided in the water of a second side process flow (3).

According to yet another embodiment of the present process, the carbon dioxide concentration in the solution or suspension of at least one earth alkali hydrogen carbonate obtained in step d) is in the range from 50 to 2 800 mg/l, preferably in the range from 200 to 750 mg/l and/or the carbon dioxide concentration in the aqueous solution of at least one earth alkali hydrogen carbonate obtained in step e) is in the range from 10 to 2 400 mg/l, preferably in the range from 100 to 550 mg/l and/or the carbon dioxide concentration in the aqueous solution of at least one earth alkali hydrogen carbonate obtained in step f) is in the range from 0.001 to 20 mg/l, preferably in the range from 0.1 to 5 mg/l.

According to one embodiment of the present process, the aqueous solution of at least one earth alkali hydrogen carbonate obtained in step f) has a pH-value in the range from 7.2 to 8.9 and preferably in the range from 7.8 to 8.4.

It should be understood that for the purpose of the present invention the following terms have the following meaning.

The term "earth alkali carbonate-comprising material" refers to a material that comprises at least 50.0 wt.-% earth alkali carbonate, based on the total dry weight of the earth alkali carbonate-comprising material.

The term "mineralization" as used in the present invention refers to the increase of essential mineral ions in water not containing minerals at all or in insufficient amount to obtain water that is palatable. A mineralization can be achieved by adding at least the specific earth alkali carbonate, such as calcium carbonate, as raw material only to the water to be treated. Optionally, e.g., for health-related benefits to ensure the appropriate intake of some essential minerals and trace elements, further substances such as magnesium salts can be mixed into or with the earth alkali carbonate, such as calcium carbonate, and then added to the water during the mineralization process. According to the national guidelines on human health and drinking water quality, the mineralized product can comprise additional minerals selected from the group comprising potassium or sodium, magnesium sulphate, potassium hydrogen carbonate, sodium hydrogen carbonate or other minerals containing essential trace elements and mixtures thereof.

Preferably, the mineralized product comprises additional minerals selected from the group comprising magnesium sulphate, potassium hydrogen carbonate, sodium hydrogen carbonate and mixtures thereof.

In the meaning of the present invention, the expressions "acidified" or "acid" refer to the Brønsted-Lowry theory, and thus refers to $H_3O^+$ ion-provider. Furthermore, the pH-value of an acid can be equal to or >7, such as in the range from >7 to 7.5, as long as a suitable corresponding base is available for accepting the $H_3O^+$ ion as donated by the acid.

For the purpose of the present application, the "$pK_a$-value" represents the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: 3rd Edition", 1991, W.H. Freeman & Co. (USA), ISBN 0-7167-2170-8. The $pK_a$-value can be determined according to methods of the prior art, which are well known to the skilled person. The $pK_a$-value of an acid is depending on the temperature, unless expressly stated otherwise the $pK_a$-values according to the present invention refer to a temperature of 22° C.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

In the following, the details and preferred embodiments of the inventive process for the preparation of an aqueous solution comprising at least one earth alkali hydrogen carbonate will be described in more detail. It is to be understood that these technical details and embodiments also apply to the inventive use, as far as applicable.

The process of the present invention is for the preparation of any aqueous solution comprising at least one earth alkali hydrogen carbonate. In particular, the process of the present invention is for the preparation of any aqueous solution comprising at least one earth alkali hydrogen carbonate which is suitable for the mineralization of water.

The term "aqueous" solution refers to a system, wherein the aqueous solvent comprises, preferably consists of, water. However, said term does not exclude that the aqueous solvent comprises minor amounts of at least one water-miscible organic solvent selected from the group comprising methanol, ethanol, acetone, acetonitrile, tetrahydrofuran and mixtures thereof. Preferably, the aqueous solvent comprises water in an amount of at least 80.0 wt.-%, preferably at least 90.0 wt.-%, more preferably at least 95.0 wt.-%, even more preferably at least 99.0 wt.-%, based on the total weight of the aqueous solvent. For example, the aqueous solvent consists of water.

The term aqueous "solution" in the meaning of the present invention refers to a system comprising aqueous solvent and particles of earth alkali carbonate and/or earth alkali hydrogen carbonate, wherein the particles of the earth alkali carbonate and/or earth alkali hydrogen carbonate are dissolved in the aqueous solvent. The term "dissolved" in the meaning of the present invention refers to systems in which no discrete solid particles are observed in the aqueous solvent.

The term "at least one" earth alkali hydrogen carbonate in the meaning of the present invention means that the earth alkali hydrogen carbonate comprises, preferably consists of, one or more earth alkali hydrogen carbonate.

In one embodiment of the present invention, the at least one earth alkali hydrogen carbonate comprises, preferably consists of, one earth alkali hydrogen carbonate. Alternatively, the at least one earth alkali hydrogen carbonate comprises, preferably consists of, two or more earth alkali hydrogen carbonate. For example, the at least one earth alkali hydrogen carbonate comprises, preferably consists of, two earth alkali hydrogen carbonates.

Preferably, the at least one earth alkali hydrogen carbonate comprises, more preferably consists of, one earth alkali hydrogen carbonate.

In one embodiment of the present invention, the at least one earth alkali hydrogen carbonate is selected from the group consisting of calcium hydrogen carbonate, magnesium hydrogen carbonate and mixtures thereof. Preferably, the at least one earth alkali hydrogen carbonate comprises, preferably consists of, calcium hydrogen carbonate.

According to step a) of the inventive process, water is provided in a main process flow (1) and in at least one side process flow (2).

The water provided in step a) can be derived from various sources and can be selected from amongst distilled water, tap water, industrial water, desalinated water such as desalinated sea water, brackish water or brine, treated wastewater or naturally soft water such as ground water, surface water or rainfall. It can also contain between 10 and 2 000 mg/l NaCl. Preferably, the water provided in step a) is desalinated water, e.g. permeate or distillate obtained from a desalination process.

In one embodiment of the inventive process, the water provided in step a) is water to be mineralized.

The water provided in step a) can be pretreated. A pretreatment can be necessary, e.g., in case the water is derived from surface water, groundwater or rainwater. For example, to achieve the drinking water guidelines the water needs to be treated through the use of chemical or physical techniques in order to remove pollutants such as organics and undesirable minerals. For example, ozonising can be used as a first pretreatment step, followed then by coagulation, flocculation, or decantation as a second treatment step. For example, iron(III) salts such as $FeClSO_4$ or $FeCl_3$, or aluminium salts such as $AlCl_3$, $Al_2(SO_4)_3$ or polyaluminium can be used as flocculation agents. The flocculated materials can be removed from the water, e.g., by means of sand filters or multi-layered filters. Further water purification processes that can be used to pretreat the water are described, e.g., in EP 1 975 310, EP 1 982 759, EP 1 974 807, or EP 1 974 806.

If sea water or brackish water is provided in step a), the sea water or brackish water is firstly pumped out of the sea by open ocean intakes or subsurface intakes such as wells, and then it undergoes physical pretreatments such as screening, sedimendation or sand removal processes. Depending on the required water quality, additional treatment steps such as coagulation and flocculation can be necessary in order to reduce potential fouling on the membranes. The pretreated sea water or brackish water can then be distilled, e.g., using multiple stage flash, multiple effect distillation, or membrane filtration such as nanofiltration or reverse osmosis, to remove the remaining particulates and dissolved substances.

It is to be noted that the water provided in step a) is provided in a main process flow (1) and in at least one side process flow (2).

That is to say, a part of the water provided in step a) is injected into the main process flow (1) and the remaining part of the water is injected into at least one side process flow (2). Thus, the main process flow (1) and the at least one side process flow (2) are connected to each other, preferably in that the at least one side process flow (2) is connected to the main process flow (1) by its inlet and outlet.

The term "at least one" side process flow means that one or more side process flows can be provided in the inventive process.

In one embodiment of the present invention, the process comprises, preferably consists of, one side process flow (2). Alternatively, the process comprises, preferably consists of, two or more side process flows (2), (3), etc. For example, the process comprises, preferably consists of, two side process flows (2) and (3).

Preferably, the process comprises, more preferably consists of, two side process flows.

If the process comprises, preferably consists of, two or more side process flows, the side process flows are independently connected to the main process flow (1); i.e. the two or more side process flows are not connected to each other.

According to step b) of the inventive process, at least one earth alkali carbonate-comprising material is added to the water provided in a first portion (4) of the side process flow (2) to obtain a suspension comprising the at least one earth alkali carbonate-comprising material.

The term "at least one" earth alkali carbonate-comprising material in the meaning of the present invention means that the earth alkali carbonate-comprising material comprises, preferably consists of, one or more earth alkali carbonate-comprising material.

In one embodiment of the present invention, the at least one earth alkali carbonate-comprising material comprises, preferably consists of, one earth alkali carbonate-comprising material. Alternatively, the at least one earth alkali carbonate-comprising material comprises, preferably consists of, two or more earth alkali carbonate-comprising materials. For example, the at least one earth alkali carbonate-comprising material comprises, preferably consists of, two or three earth alkali carbonate-comprising materials, more preferably two earth alkali carbonate-comprising materials.

Preferably, the at least one earth alkali carbonate-comprising material comprises, more preferably consists of, one earth alkali carbonate-comprising material.

For example, the at least one earth alkali carbonate-comprising material comprises, more preferably consists of, a calcium carbonate-comprising material.

According to one embodiment of the inventive process, the at least one earth alkali carbonate-comprising material in step b), preferably being a calcium carbonate-comprising material, is selected from the group consisting of precipitated calcium carbonate, modified calcium carbonate, ground calcium carbonate and mixtures thereof.

Preferably, the at least one earth alkali carbonate-comprising material in step b) is ground calcium carbonate.

"Ground calcium carbonate (GCC)" in the meaning of the present invention is a calcium carbonate obtained from natural sources including marble, chalk or limestone, and processed through a treatment such as grinding, screening and/or fractionizing by wet and/or dry, for example, by a cyclone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

"Modified calcium carbonate" in the meaning of the present invention is a surface-reacted natural calcium carbonate that is obtained by a process where natural calcium carbonate is reacted with one or more acids having a $pK_a$ at 25° C. of 2.5 or less and with gaseous $CO_2$ formed in situ and/or coming from an external supply, and optionally in the presence of at least one aluminium silicate and/or at least one synthetic silica and/or at least one calcium silicate and/or at least one silicate of a monovalent salt such as sodium silicate and/or potassium silicate and/or lithium silicate, and/or at least one aluminium hydroxide and/or at least one sodium and/or potassium silicate. Further details about the preparation of the surface-reacted natural calcium carbonate are disclosed in WO 00/39222, WO 2004/083316 and US 2004/0020410 A1, the contents of these references herewith being included in the present patent application.

The earth alkali carbonate-comprising material, preferably being a calcium carbonate-comprising material, is preferably a ground calcium carbonate (GCC).

For example, the at least one earth alkali carbonate-comprising material of step b), preferably being a calcium carbonate-comprising material, is selected from the group comprising marble, limestone, chalk, half burnt lime, burnt lime, dolomitic limestone, calcareous dolomite, half burnt dolomite, burnt dolomite, and precipitated earth alkali carbonates such as precipitated calcium carbonate, for example of calcitic, aragonitic and/or vateritic mineral crystal structure, for example from water de-hardening by the addition of $Ca(OH)_2$. The use of marble, limestone and/or chalk is preferred because they are naturally occurring minerals and the turbidity of the final drinking water quality is guaranteed by using a clear aqueous solution comprising at least one earth alkali hydrogen carbonate that is produced using these naturally occurring minerals. Natural marble deposits are mostly containing acid insoluble silicate impurities. However, such acid insoluble, sometimes coloured silicates do not affect the final water quality with respect of turbidity when using the product that is prepared by the inventive process.

According to one embodiment of the present invention, the at least one earth alkali carbonate-comprising material comprises, preferably consists of, particles consisting of earth alkali carbonate in an amount of ≥50.0 wt.-%, preferably of 90.0 wt.-%, more preferably of ≥95.0 wt.-% and most preferably of ≥97.0 wt.-%, based on the total dry weight of the at least one at least one earth alkali carbonate-comprising material.

It is further preferred that the at least one earth alkali carbonate-comprising material of step b) is a micronized earth alkali carbonate-comprising material.

For the purpose of the present invention, the term "micronized" refers to a particle size in the micrometre range, e.g., a particle size from 0.1 to 50.0 µm. The micronized particles can be obtained by techniques based on friction and/or impact, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis or liquid foam synthesis.

For example, the at least one earth alkali carbonate-comprising material of step b) has a weight median particle size $d_{50}$ from 0.1 to 50.0 µm, preferably from 0.2 to 25.0 µm, more preferably from 0.3 to 10.0 µm, and most preferably from 0.5 to 5.0 µm.

Throughout the present document, the "particle size" of an earth alkali carbonate-comprising material and other materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger and the remaining 50 wt.-% of grains smaller than this particle size. For the purpose of the present invention the particle size is specified as weight median particle size $d_{50}$ unless indicated otherwise. For determining the weight median particle size $d_{50}$ value a Sedigraph can be used. For the purpose of the present invention, the "particle size" of surface-reacted calcium carbonate is described as volume determined particle size distributions. For determining the volume determined particle size distribution, e.g. the volume median grain diameter ($d_{50}$) or the volume determined top cut particle size ($d_{98}$) of surface-reacted calcium carbonate, a Malvem Mastersizer 2000 can be used. The weight determined particle size distribution corresponds to the volume determined particle size if the density of all the particles is equal.

In one embodiment of the instant invention, the earth alkali carbonate-comprising material of step b) has a BET specific surface area of from 0.01 to 200.0 m²/g, and preferably of from 1.0 to 100.0 m²/g, measured by nitrogen gas adsorption using the BET isotherm (ISO 9277:2010).

Additionally or alternatively, the at least one earth alkali carbonate-comprising material of step b) can comprise an HCl insoluble content from 0.02 to 90.0 wt.-%, 0.03 to 25.0 wt.-%, or 0.05 to 15.0 wt.-%, based on the total weight of the at least one earth alkali carbonate-comprising material of step b). Preferably, the HCl insoluble content of the at least one earth alkali carbonate-comprising material does not exceed 1.0 wt.-%, based on the total weight of the calcium carbonate. The HCl insoluble content can be, e.g., minerals such as quartz, silicate or mica.

The at least one earth alkali carbonate-comprising material in step b) is added in dry form or in aqueous form to the water provided in the at least one side stream flow. If the at least one earth alkali carbonate-comprising material in step b) is added in dry form, the at least one earth alkali carbonate-comprising material can be in form of a powder or in granular form.

The term "dry" with regard to the at least one earth alkali carbonate-comprising material is understood to be a material having less than 0.3% by weight of water relative to the weight of the at least one earth alkali carbonate-comprising material. The % water is determined according to the Coulometric Karl Fischer measurement method, wherein the at least one earth alkali carbonate-comprising material is heated to 220° C., and the water content released as vapour and isolated using a stream of nitrogen gas (at 100 ml/min) is determined in a Coulometric Karl Fischer unit.

If the at least one earth alkali carbonate-comprising material in step b) is added in aqueous form, the at least one earth alkali carbonate-comprising material is in form of an aqueous slurry having solids content between 5.0 and 15.0 wt.-% such as about 10 wt.-%, based on the total weight of the slurry. This slurry is preferably generated on site using a high concentrated slurry without using any dispersing agent having e.g. a solid content between 30.0 and 50.0 wt.-%, such as about 40 wt.-% or using the earth alkali carbonate-comprising material in solid form for example, as powder or in form of granules.

For the purpose of the present invention, a "suspension" or "slurry" refers to a system comprising solvent, i.e. an aqueous solvent, and particles of earth alkali carbonate-comprising material and/or earth alkali hydrogen carbonate, wherein at least a part of the particles of the earth alkali carbonate-comprising material and/or earth alkali hydrogen carbonate are present as insoluble solids in the aqueous solvent. Said term does not exclude that a part of the earth alkali carbonate-comprising material and/or earth alkali hydrogen carbonate particles is dissolved in the aqueous solvent.

According to step b) of the inventive process, the at least one earth alkali carbonate-comprising material is added to the water provided in the side process flow (2) such that a suspension comprising the at least one earth alkali carbonate-comprising material is obtained.

The suspension comprising the at least one earth alkali carbonate-comprising material obtained in step b) preferably has a solids content in the range from 0.01 to 20.0 wt.-%, more preferably in the range from 1.0 to 15.0 wt.-% and most preferably in the range from 5.0 to 10.0 wt.-%, based on the total weight of the suspension.

In addition to the at least one earth alkali carbonate-comprising material, the suspension comprising the at least one earth alkali carbonate-comprising material can comprise further micronized minerals. According to one embodiment, the suspension comprising the at least one earth alkali carbonate-comprising material can comprise micronized calcium magnesium carbonate, e.g. dolomitic limestone, calcareous dolomite or half burnt dolomite, magnesium oxide such as burnt dolomite, magnesium sulphate, potassium hydrogen carbonate, sodium hydrogen carbonate and/ or other minerals containing essential trace elements.

According to step c) of the inventive process, carbon dioxide or an acid having a $pK_a$-value<5 is added to the water provided in a second portion (5) of the side process flow (2) and adjusting the pH-value to a range from 2.5 to 7.5 to obtain acidified water. Preferably, the $pK_a$-value<5 is determined at 22° C.

The carbon dioxide used is selected from among gaseous carbon dioxide, liquid carbon dioxide, solid carbon dioxide and a gaseous mixture of carbon dioxide and other gases such as carbon dioxide containing flue gases exhausted from industrial processes like combustion processes or calcination processes or alike. Preferably, the carbon dioxide is gaseous carbon dioxide. When a gaseous mixture of carbon dioxide and other gases is used, then the carbon dioxide is present in the range of 90.0 to about 99.0% by volume, and preferably in the range of 95.0 to 99.0% by volume, based on the total volume of the gaseous mixture. For example, the carbon dioxide is present in an amount of at least 97.0% by volume, based on the total volume of the gaseous mixture.

The acid used in the inventive process is preferably an acid having a $pK_a$-value<4 at 22° C. For example, the acid in step c) is selected from the group consisting of sulphuric acid, hydrochloric acid, nitric acid or citric acid and mixtures thereof. In one embodiment, the acid will be chosen among the acids with a $pK_a$-value lower than or equal to zero at 22° C. and more particularly chosen from sulphuric acid, hydrochloric acid or mixtures thereof. Alternatively, the acid can be a salt having an acidic pH, such as alkali metal hydrogen salts, e.g. $NaHSO_4$ and/or $KHSO_4$.

It is one specific requirement of the inventive process that carbon dioxide or an acid having a $pK_a$-value<5 (at 22° C.) is added to the water provided in the second portion (5) of the side process flow (2) such that a pH-value in the range from 2.5 to 7.5 is adjusted. Preferably, the pH-value in step c) is adjusted to the range from 3.0 to 7.0 and preferably to the range from 4.0 to 5.0.

Adding carbon dioxide or an acid having a $pK_a$-value<5 (at 22° C.) to the water provided in a second portion (5) of the side process flow (2) thus results in acidified water.

The carbon dioxide or acid having a $pK_a$-value<5 (at 22° C.) can be injected into the water provided in the second portion (5) of the side process flow (2) at a controlled rate, forming a dispersion of carbon dioxide bubbles in the stream and allowing the bubbles to dissolve therein. For example, the dissolution of carbon dioxide or acid having a $pK_a$-value<5 (at 22° C.) in the water can be facilitated by providing the water stream at a flow rate of 10 to 1 500 mg/l and preferably 50 to 1 500 mg/l according to the starting $CO_2$ concentration in the permeate/distillate, the final target pH value (excess $CO_2$) and final target calcium concentration (added $CaCO_3$).

The amount of carbon dioxide or acid having a $pK_a$-value<5 (at 22° C.) that is injected into the water provided in the second portion (5) of the side process flow (2) will depend on the amount of carbon dioxide that is already present in the water provided in the at least one first side process flow (2). The amount of carbon dioxide that is already present in the water, in turn, will depend, e.g., on the treatment up-stream of the water.

Water, for example, that has been desalinated by flash evaporation will contain another amount of carbon dioxide, and thus another pH, than water that has been desalinated by reverse osmosis. Water, for example, that has been desalinated by reverse osmosis may have a pH of about 5.3 and an amount of $CO_2$ of about 1.5 mg/l.

It is to be noted that the carbon dioxide or acid having a $pK_a$-value<5 (at 22° C.) is added to the water provided in a second portion (5) of the side process flow (2), while the at least one earth alkali carbonate-comprising material is added to the water provided in a first portion (4) of the side process flow (2). Thus, it is appreciated that the first portion (4) of the side process flow (2) differs from the second portion (5) of the side process flow (2), i.e. the first portion (4) and the second portion (5) of the side process flow (2) are separately located at the same side process flow (2).

In one embodiment of the inventive process, the second portion (5) of the side process flow (2) is located before the first portion (4) of the side process flow (2). Thus, in this embodiment of the inventive process, the suspension comprising the at least one earth alkali carbonate-comprising material obtained in step b) is injected into the acidified water obtained in step c).

According to step d) of the inventive process, the suspension obtained in step b) is combined with the acidified water obtained in step c) to obtain a solution or suspension of at least one earth alkali hydrogen carbonate.

The combining of the suspension obtained in step b) with the acidified water obtained in step c) according to process step d) can be accomplished by any conventional means known to the skilled person. Preferably, the combining may be carried out under mixing and/or homogenizing conditions. The skilled person will adapt these mixing and/or homogenizing conditions such as the mixing speed and temperature according to his process equipment.

For example, the combining may be carried out in a reactor unit (6), preferably a tank or a tube reactor. Such tanks or tube reactors are well known to the skilled person and are available from a wide range of suppliers.

In one embodiment of the inventive process, step d) is preferably carried out at a temperature ranging from 5 to 55° C., more preferably from 15 to 45° C. to ensure a sufficient combining of the suspension obtained in step b) and the acidified water obtained in step c).

It is appreciated that the dissolution rate of earth alkali carbonate in the liquid phase, i.e. water, of the suspension comprising the at least one earth alkali carbonate-comprising material to obtain the solution or suspension of at least one earth alkali hydrogen carbonate depends on the quantity of carbon dioxide or acid having a $pK_a$-value<5 dosed but also on the temperature, pH, pressure, initial earth alkali carbonate concentration in the suspension as well as the dosing rate at which the carbon dioxide or acid having a $pK_a$-value<5 (at 22° C.) is introduced into the suspension comprising the at least one earth alkali carbonate-comprising material.

It is preferred that the carbon dioxide concentration in the solution or suspension of at least one earth alkali hydrogen carbonate obtained in step d) is in the range from 50 to 2 800 mg/l, preferably in the range from 200 to 750 mg/l.

Additionally or alternatively, the amount of $CO_2$ used, in mol, to produce 1 mol of the at least one earth alkali hydrogen carbonate in the solution or suspension obtained in step d) is in the range of 0.5 to 6.0 mol, preferably in the range of 0.5 to 4.5 mol, and most preferably in the range of 0.5 to 3.0 mol.

It is to be noted that the kind of the at least one earth alkali hydrogen carbonate in the solution or suspension obtained in step d) depends on the at least one earth alkali carbonate-comprising material provided in step b) of the inventive process. Thus, if the at least one earth alkali carbonate-comprising material comprises a calcium carbonate-comprising material, the at least one earth alkali hydrogen carbonate in the solution or suspension obtained in step d) comprises calcium hydrogen carbonate. Alternatively, if the at least one earth alkali carbonate-comprising material consists of calcium carbonate, the at least one earth alkali hydrogen carbonate in the solution or suspension obtained in step d) consists of calcium hydrogen carbonate.

It is appreciated that the solution or suspension of at least one earth alkali hydrogen carbonate obtained in step d) preferably has an earth alkali metal concentration as earth alkali hydrogen carbonate in the range from 100 to 1 000 mg/l and preferably in the range from 300 to 600 mg/l. In one embodiment of the inventive process, the solution or suspension of at least one earth alkali hydrogen carbonate obtained in step d) being calcium hydrogen carbonate has a calcium metal concentration as calcium hydrogen carbonate in the range from 100 to 1 000 mg/l and preferably in the range from 300 to 600 mg/l.

As mentioned above, a solution or suspension of at least one earth alkali hydrogen carbonate is obtained in step d).

If the solution or suspension of at least one earth alkali hydrogen carbonate obtained in step d) comprises undissolved solid particles of the at least one earth alkali carbonate-comprising material, the solution or suspension of at least one earth alkali hydrogen carbonate is preferably subjected to a separation step g). Separation step g) is preferably carried out in separation unit (7).

In one embodiment of the inventive process, the separation can be accomplished by any conventional means known to the skilled person which is suitable for removing undissolved solid particles from a solution or suspension. For example, the separation step g) is carried out by passing the solution or suspension of at least one earth alkali hydrogen carbonate through a filter, a membrane or a filter bed or by centrifuging the solution or suspension of at least one earth alkali hydrogen carbonate.

According to step e) of the inventive process, the solution of at least one earth alkali hydrogen carbonate obtained in step d) is dosed into the water provided in the main process flow (1) to obtain an aqueous solution of at least one earth alkali hydrogen carbonate.

It is one requirement of the inventive process that a solution of at least one earth alkali hydrogen carbonate obtained in step d) is dosed into the water provided in the main process flow (1). Thus, if a suspension of at least one earth alkali hydrogen carbonate is obtained in process step d), the process further comprises process step g) before process step e) is carried out, i.e. process step g) is carried out after step d) and before step e). By dosing the solution of at least one earth alkali hydrogen carbonate obtained in step d) into the water provided in the main process flow (1) the water in the main process flow (1) is preferably adjusted to a pH-value in the range from 5.5 to 7.5 and preferably to the range from 6.0 to 7.0.

It is preferred that the carbon dioxide concentration in the aqueous solution of at least one earth alkali hydrogen carbonate obtained in step e) is in the range from 10 to 2 400 mg/l, preferably in the range from 100 to 550 mg/l.

Additionally or alternatively, the amount of $CO_2$ used, in mol, to produce 1 mol of the at least one earth alkali hydrogen carbonate in the solution obtained in step e) is in the range of 0.5 to 2.0 mol, preferably in the range of 0.5 to 1.7 mol, more preferably in the range of 0.5 to 1.5 mol, and most preferably in the range of 0.5 to 1.3 mol.

According to step f) of the inventive process, at least one earth alkali hydroxide provided in water is added to the aqueous solution of at least one earth alkali hydrogen carbonate obtained in the main process flow (1) of step e) to adjust the pH-value of the aqueous solution of at least one earth alkali hydrogen carbonate to a range from 7.0 to 9.0 and to form an aqueous solution of at least one earth alkali hydrogen carbonate having an earth alkali concentration as earth alkali hydrogen carbonate in the range from 10 to 300 mg/l.

It is thus required that at least one earth alkali hydroxide is added to the aqueous solution of at least one earth alkali hydrogen carbonate obtained in the main process flow (1) of step e).

The term "at least one" earth alkali hydroxide in the meaning of the present invention means that the earth alkali hydroxide comprises, preferably consists of, one or more earth alkali hydroxide.

In one embodiment of the present invention, the at least one earth alkali hydroxide comprises, preferably consists of, one earth alkali hydroxide. Alternatively, the at least one earth alkali hydroxide comprises, preferably consists of, two or more earth alkali hydroxides. For example, the at least one earth alkali hydroxide comprises, preferably consists of, two or three earth alkali hydroxides, more preferably two earth alkali hydroxides.

Preferably, the at least one earth alkali hydroxide comprises, more preferably consists of, one earth alkali hydroxide.

The at least one earth alkali hydroxide added in step f) preferably comprises calcium hydroxide and/or magnesium hydroxide. Due to the fact of very low solubility of $Mg(OH)_2$ in water compared to $Ca(OH)_2$ the speed of reaction of $Mg(OH)_2$ with $CO_2$ is very limited and in presence of $Ca(OH)_2$ in suspension the reaction of $CO_2$ with $Ca(OH)_2$ is very much preferred. Thus, the at least one earth alkali hydroxide preferably consists of calcium hydroxide.

According to one embodiment of the inventive process, the at least one earth alkali hydroxide is preferably at least one micronized earth alkali hydroxide.

For example, the at least one earth alkali hydroxide of step f) has a weight median particle size $d_{50}$ from 0.1 to 100.0 μm, preferably from 0.2 to 50.0 μm, more preferably from 0.3 to 25.0 μm, and most preferably from 0.5 to 10.0 μm.

In one embodiment of the instant invention, the at least one earth alkali hydroxide of step f) has a BET specific surface area of from 0.01 to 200.0 m$^2$/g, and preferably of from 1.0 to 100.0 m$^2$/g, measured by nitrogen gas adsorption using the BET isotherm (ISO 9277:2010).

The at least one earth alkali hydroxide is preferably added in step f) such that the concentration of the at least one earth alkali hydroxide in the water as provided in step f) is in the range from 800 to 1 700 mg/l and preferably in the range from 1 000 to 1 300 mg/l.

The at least one earth alkali hydroxide of step f) is provided in water. Thus, it is appreciated that the at least one earth alkali hydroxide is in form of a solution or suspension.

If the at least one earth alkali hydroxide is in form of a solution, the solution preferably has an earth alkali hydroxide content from 0.05 wt.-% to 0.4 wt.-%, preferably about 0.1 wt.-%, based on the total weight of the solution. The earth alkali hydroxide solution is preferably generated on site. Thus, if an earth alkali hydroxide solution is provided in step f), the earth alkali hydroxide solution is preferably prepared with the water provided in process step a). In other words, if an earth alkali hydroxide solution is provided in step f), the process preferably comprises a main process flow (1) and at least one side process flow (2) and a second side process flow (3).

In one embodiment of the inventive process, the at least one earth alkali hydroxide in the form of a solution is thus provided in the water of a second side process flow (3).

In this embodiment, a part of the water provided in step a) is injected into the main process flow (1) and the remaining part of the water is injected into the at least one side process flow (2) and second side process flow (3). Thus, the at least one side process flow (2) and the second side process flow (3) are connected to the main process flow (1), preferably in that the at least one side process flow (2) and second side process flow (3) are connected to the main process flow (1) by their respective inlets and outlets.

In one embodiment, the inlets of the at least one side process flow (2) and the second side process flow (3) can be independently connected to the main process flow (1) in any order. In this regard, it is only required that the inlet of the second side process flow (3) is located before the outlet of the at least one side process flow (2). Preferably, the inlets of the at least one side process flow (2) and the second side process flow (3) are connected to the main process flow (1) at the same location.

The term "before" in the meaning of the present invention refers to the preceding position ahead of another unit of the installation.

As regards the outlets of the at least one side process flow (2) and the second side process flow (3), it is appreciated that the outlet of the second side process flow (3) is preferably located after the at least one side process flow (2) at the main process flow (1).

Alternatively, the at least one earth alkali hydroxide is in form of a suspension. If the at least one earth alkali hydroxide as provided in step f) is in form of a suspension, the suspension preferably has an earth alkali hydroxide content from 15.0 to 25.0 wt.-%, preferably about 20.0 wt.-%, based on the total weight of the suspension.

In this embodiment, the earth alkali hydroxide suspension may be generated on site as already described for the earth alkali hydroxide solution or independently from the inventive process. If the earth alkali hydroxide suspension is prepared independently from the inventive process, the earth alkali hydroxide suspension is thus not prepared from the water in the second side process flow (3).

By adding the at least one earth alkali hydroxide provided in water to the aqueous solution of at least one earth alkali hydrogen carbonate obtained in the main process flow (1) of step e), the pH-value of the aqueous solution of at least one earth alkali hydrogen carbonate obtained in step f) is adjusted to a range from 7.0 to 9.0. Preferably, the aqueous solution of at least one earth alkali hydrogen carbonate obtained in step f) has a pH-value in the range from 7.2 to 8.9 and preferably in the range from 7.8 to 8.4.

In order to increase the efficiency of $CO_2$ consumption at decreased sludge production it is one specifically required that the molar ratio between the at least one earth alkali carbonate-comprising material in step b) and the earth alkali hydroxide in step f) is in the range from 50:1 to 1:10. For example, the molar ratio between the at least one earth alkali carbonate-comprising material in step b) and the earth alkali hydroxide in step f) is in the range from 50:1 to 1:3, preferably from 3:1 to 1:1.5.

The aqueous solution comprising at least one earth alkali hydrogen carbonate thus obtained by the inventive process has a carbon dioxide concentration preferably in the range from 0.001 to 20 mg/l, more preferably in the range from 0.1 to 5 mg/l.

It is appreciated that the aqueous solution of at least one earth alkali hydrogen carbonate obtained in step f) has an earth alkali metal concentration as earth alkali hydrogen carbonate in the range from 10 to 300 mg/l. Preferably, the aqueous solution of at least one earth alkali hydrogen carbonate obtained in step f) has an earth alkali metal concentration as earth alkali hydrogen carbonate in the range from 20 to 200 mg/l and more preferably from 50 to 120 mg/l.

In one embodiment of the inventive process, the aqueous solution of at least one earth alkali hydrogen carbonate obtained in step f) comprises calcium hydrogen carbonate, the solution having a calcium metal concentration as calcium hydrogen carbonate in the range from 10 to 300 mg/l, preferably in the range from 20 to 200 mg/l and more preferably from 25 to 150 mg/l.

In an alternative embodiment of the inventive process, the aqueous solution of at least one earth alkali hydrogen carbonate obtained in step f) comprises magnesium hydrogen carbonate, the solution having a magnesium metal concentration as magnesium hydrogen carbonate in the range from 10 to 300 mg/l, preferably in the range from 10 to 50 mg/l and more preferably from 10 to 25 mg/l.

Alternatively, the aqueous solution of at least one earth alkali hydrogen carbonate obtained in step f) comprises calcium hydrogen carbonate and magnesium hydrogen carbonate, the solution having a total calcium and magnesium metal concentration as calcium and magnesium hydrogen carbonate in the range from 10 to 300 mg/l, preferably in the range from 20 to 200 mg/l and more preferably from 25 to 200 mg/l.

In one embodiment of the present invention, the aqueous solution of at least one earth alkali hydrogen carbonate obtained in step f) has a dissolved content of the at least one earth alkali hydrogen carbonate in the range from 0.01 to 20.0 wt.-%, more preferably in the range from 0.01 to 10.0 wt.-% and most preferably in the range from 0.01 to 1.0 wt.-%, based on the total weight of the aqueous solution.

Additionally or alternatively, the aqueous solution of at least one earth alkali hydrogen carbonate obtained in step f) has a turbidity value of lower than 1 NTU, preferably of lower than 0.5 NTU, and most preferably of lower than 0.3 NTU. For example, the aqueous solution of at least one earth alkali hydrogen carbonate obtained in step f) has a turbidity value of lower than 0.2 NTU or of lower than 0.1 NTU.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

According to one embodiment of the inventive process, the aqueous solution of at least one earth alkali hydrogen carbonate obtained in step f) has a hardness from 0.5 to 17° dH, preferably from 1 to 10° dH, and most preferably from 1.5 to 7° dH.

For the purpose of the present invention, the hardness refers to the German hardness and is expressed in "degree German hardness, ° dH". In this regard, the hardness refers to the total amount of earth alkali ions in the aqueous solution comprising the earth alkali hydrogen carbonate.

It is preferred that the aqueous solution comprising at least one earth alkali hydrogen carbonate obtained by the inventive process has a hardness that is at least 3° dH, more preferably at least 5° dH, higher than the hardness of the water provided in step a).

The aqueous solution of at least one earth alkali hydrogen carbonate obtained by the inventive process is suitable for the mineralization of water. For example, the aqueous solution of at least one earth alkali hydrogen carbonate obtained by the inventive process is suitable for the mineralization of desalinated or naturally soft water.

The water that can be mineralized by using the aqueous solution of at least one earth alkali hydrogen carbonate obtained by the inventive process can be derived from various sources and can be selected from amongst distilled water, industrial water, tap water, desalinated water such as desalinated sea water, brackish water or brine, treated wastewater or naturally soft water such as ground water, surface water or rainfall.

Preferably, the water to be mineralized by using the aqueous solution of at least one earth alkali hydrogen carbonate obtained by the inventive process is desalinated water, e.g. permeate or distillate obtained from a desalination process.

In view of the good results obtained, the present application further refers in another aspect to a process for the mineralization of water, the process comprises the steps of
i) providing water to be mineralized,
ii) providing an aqueous solution comprising at least one earth alkali hydrogen carbonate obtained by the process, as described herein,
iii) combining the water to be mineralized of step i) and the aqueous solution comprising at least one earth alkali hydrogen carbonate of step ii) in order to obtain mineralized water, and
iv) adding at least one earth alkali hydroxide to the mineralized water obtained in step iii).

With regard to the definition of the water to be mineralized, the aqueous solution comprising at least one earth alkali hydrogen carbonate obtained by the process, the at least one earth alkali hydroxide and preferred embodiments thereof, reference is made to the statements provided above when discussing the technical details of the process for the preparation of an aqueous solution comprising at least one earth alkali hydrogen carbonate of the present invention.

It is preferred that the aqueous solution comprising at least one earth alkali hydrogen carbonate provided in step ii) has a hardness that is at least 3° dH, more preferably at least 5° dH, higher than the hardness of the water to be mineralized provided in step i).

In order to further increase the mineral content, to neutralize any remaining "aggressive" carbon dioxide and/or to increase the pH to achieve a stable and balanced final water quality, it is required to add at least one earth alkali hydroxide to the mineralized water obtained in step iii).

Thus, the process for the mineralization of water comprises step iv) of adding at least one earth alkali hydroxide to the mineralized water operated in step iii).

A further aspect of the present invention refers to the use of an aqueous solution comprising at least one earth alkali hydrogen carbonate obtained by the process as defined herein, for the mineralization of water. The water is preferably desalinated or naturally soft water.

With regard to the definition of the water to be mineralized, the aqueous solution comprising at least one earth alkali hydrogen carbonate obtained by the process and preferred embodiments thereof, reference is made to the statements provided above when discussing the technical details of the process for the preparation of an aqueous solution comprising at least one earth alkali hydrogen carbonate of the present invention.

The following examples may additionally illustrate the invention but are not meant to restrict the invention to the exemplified embodiments.

EXPERIMENTAL SECTION

1. Measurement Methods

In the following the measurement methods implemented in the examples are described.

pH of an Aqueous Suspension or Solution

The pH of a suspension is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Solids Content of an Aqueous Suspension

Moisture Analyser

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Particle Size Distribution (Mass % Particles with a Diameter <X) and Weight Median Diameter ($d_{50}$) of a Particulate Material The particle size distribution of the products was measured using a Malvern Mastersizer 2000 Laser Diffraction System (Malvern Instruments Plc., Great Britain) using the Fraunhofer light scattering approximation. The method and instrument are known to the skilled person are commonly used to determine particle sizes of fillers and other particulate materials.

The measurement was carried out in an aqueous solution comprising 0.1 wt.-% $Na_4P_2O_7$. The samples were dispersed using a high speed stirrer and in the presence of supersonics.

Turbidity of an Aqueous Suspension of Solution

The turbidity was measured with a Hach Lange 2100AN IS Laboratory Turbidimeter and the calibration was performed using StabCal turbidity standards (formazine standards) of <0.1, 20, 200, 1 000, 4 000 and 7 500 NTU.

Alkalinity of the Aqueous Solution and Hardness

The alkalinity of the aqueous solution has been determined by titration of a sample with a 0.1 M solution of hydrochloric acid. The end point of the titration is reached at a constant pH of 4.3. The amount of the alkalinity has been calculated by the following equation:

$$\text{Alkalinity} = \text{Volume of acid (ml)} \times 0.1 \times 100.08 \times 1000 / (2 \times \text{Volume of sample (ml)})$$

The hardness refers to the German hardness and is expressed in "degree German hardness, ° dH". Hardness and alkalinity have been determined by the same method in one titration.

Acidity of Aqueous Solution

The acidity of the aqueous solution has been determined by titration of the free $CO_2$ with a 0.01 M solution of sodium hydroxide. The end point of the titration is reached at a constant pH of 8.3. The amount of free $CO_2$ has been calculated by the following equation:

$$\text{Free } CO_2 = \text{Volume of NaOH (ml)} \times 0.01 \times 44.01 \times 1000 / \text{Volume of sample (ml)}$$

BET Specific Surface Area of a Material

Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

2. Examples

Inventive Installation

A general process flow sheet of one installation according to the present invention is shown in FIG. 1. The installation comprises an earth alkali carbonate storage silo (8) with dosing screw feeder and a vessel for preparing a suspension of the earth alkali carbonate (9), a reactor tank (6), static mixers for dosing both carbon dioxide (5) and the earth alkali carbonate suspension (4), concentrate dosing system and filtration system (7) and an earth alkali hydroxide dosing system.

An earth alkali hydrogen carbonate solution is produced and dosed in a first side process flow (2). An earth alkali hydroxide is dosed in a second side process flow (3). Both side process flows are merged in the main process flow (1).

Figure 2:
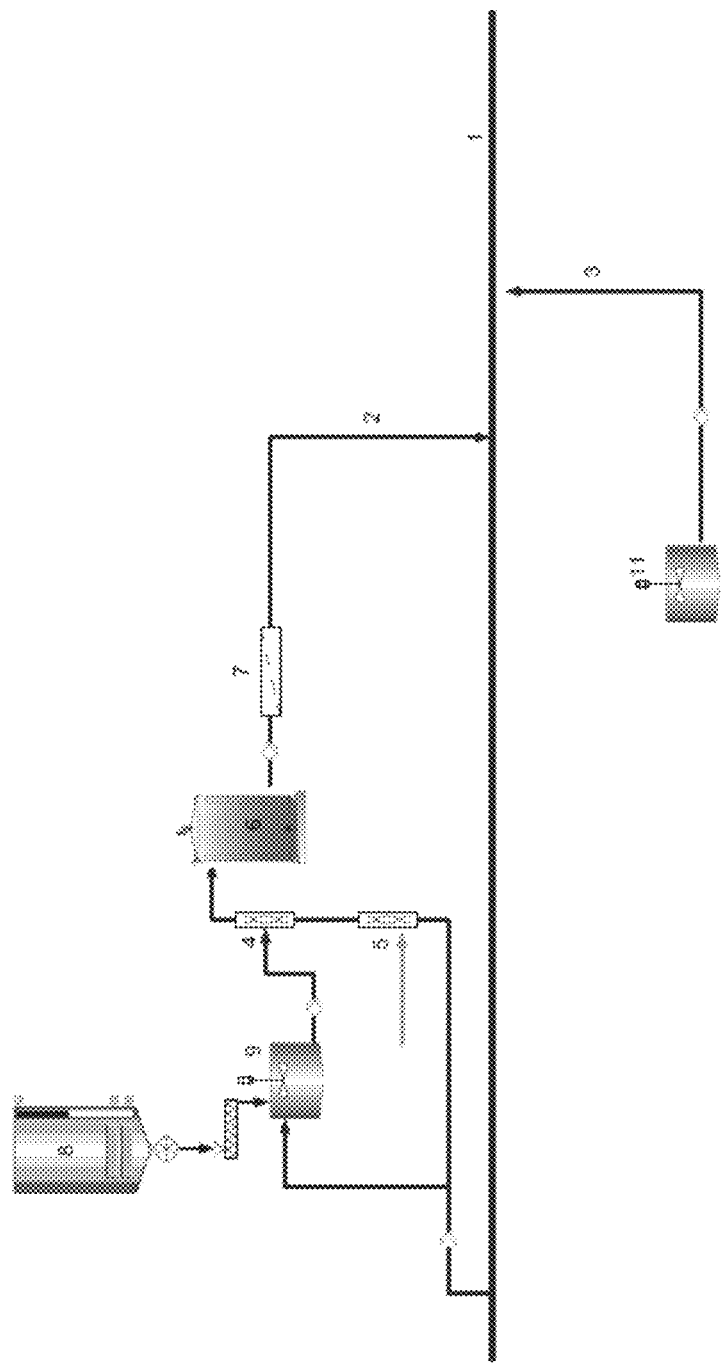

In a full sized installation, a saturated solution of earth alkali hydroxide will normally be generated first of 0.1 to 0.15 wt.-% concentration. For carrying out trials on a pilot scale, as in Example 1 below, it is more useful to use a commercially available but highly reactive earth alkali hydroxide suspension of high purity, which can be dosed via a second side process flow (see FIG. 2) or directly to the main process flow. As the concentrations of the suspension are much higher (approx. 20 wt.-%), the flow rates for this process stream (3) are much slower.

Feed water is provided in all process flows, the feed water was obtained from reverse osmosis system, producing water of the following water specification:

| | |
|---|---|
| Sodium: | <1 mg/l |
| Chloride: | <2 mg/l |
| Calcium: | 1.2 mg/l |
| Magnesium: | <1 mg/l |
| °dH: | <2 |
| pH | 6.3 |
| Conductivity: | 10.5 μS/cm |

An earth alkali carbonate solution can be produced in the first side stream using the above mentioned equipment in the following manner: An earth alkali carbonate-comprising material is added to the vessel for preparing the suspension of earth alkali carbonate (9) from the storage silo (8) using a loss-in-weight screw feeder to accurately measure the quantity of material added. Water is also added to the tank and the mixer used to create a homogeneous suspension of known solids content. Carbon dioxide is added to the remainder of the first side stream process via a static mixer to form an acidic solution. The suspension is then transferred to a process flow stream a dosing pump where it is mixed via a static mixer. The combined side stream is then added to the reactor tank (6). The reaction between the earth alkali carbonate material and the acidic solution (carbon dioxide or otherwise) allows the formation of an earth alkali hydrogen carbonate solution within the reactor tank (6). From the reactor tank (6), a dosing pump is used to add the earth alkali hydrogen carbonate solution to the main process flow (2) through a set of filters (7) which remove any unreacted earth alkali carbonate material which appear as undissolved solids.

Within the second process side stream, a 20 wt.-% suspension of earth alkali hydroxide is stored within a vessel (11). A dosing pump is used to add this suspension to the main process flow (3).

Example 1

Natural calcium carbonate powder (Millicarb from Omya International, Orgon, France, $d_{50}$=3 μm, according to technical data sheet) and a calcium hydroxide suspension (Schaferkalk, Precal 72, 20 wt.-% concentration in water) have been used as starting materials in a pilot plant. The Schaferkalk product (Precal 72) is a highly reactive 20 wt.-%% calcium hydroxide suspension and has been directly dosed into the main stream.

The reaction and operation conditions are given in Table 1 below.

TABLE 1

Reaction and operation conditions Example 1.

| | First side process flow | Ca(OH)$_2$ dosing | Main process flow |
|---|---|---|---|
| Flow rate (1/hr) | 200 | 0.36 | 4000 |
| Calcium carbonate dosage (mg/l) | 600 | N/A | N/A |
| CO$_2$ dosage [mg/l] | 925 | N/A | N/A |
| Water quality: | | | |
| Alkalinity (mg/l as CaCO$_3$) | 540 $^c$ | 270 000 $^d$ | 50 |
| Hardness (mg/l as CaCO$_3$) | 540 $^c$ | 270 000 $^d$ | 50 |
| pH | 6.4 | 11.7 | 8.2 |
| Temperature [° C.] | 16 | 16 | 16 |
| Turbidity [NTU] | 0 | N/A (suspension) | 0 |
| Solid content (%) | 0.06 $^b$/0.006 $^a$/0 $^c$ | 20 | 0 |

$^a$ After reaction between CO$_2$ and calcium carbonate;
$^b$ Before reaction between CO2 and calcium carbonate;
$^c$ After filtration;
$^d$ Concentration expressed as mg/l CaCO$_3$;
(N/A = not applicable).

List of Reference Signs (1) Main process flow
(2) First side process flow
(3) Second side process flow
(4) Portion of (2) where the at least one earth alkali carbonate-comprising material is provided
(5) Portion of (2) where carbon dioxide or acid having a pK$_a$-value<5 is provided
(6) Reactor unit
(7) Separation unit
(8) Earth alkali carbonate-comprising material storage silo
(9) Vessel for preparing suspension of earth alkali carbonate-comprising material
(10) Silo for earth alkali hydroxide
(11) Vessel for preparing suspension of earth alkali hydroxide
(12) Vessel for preparing saturated solution of earth alkali hydroxide

The invention claimed is:
1. A process for the preparation of an aqueous solution comprising at least one earth alkali hydrogen carbonate, comprising the steps of:
 a) providing water in a main process flow and in a first side process flow;
 b) adding at least one earth alkali carbonate-comprising material to the water provided in a first portion of the first side process flow to obtain a suspension comprising the at least one earth alkali carbonate-comprising material;
 c) adding carbon dioxide or an acid having a pK$_a$-value<5 to the water provided in a second portion of the first side process flow and adjusting the pH-value to a range from 2.5 to 7.5 to obtain acidified water;
 d) reacting the suspension obtained in step b) with the acidified water obtained in step c) in a reactor unit of the first side process flow to obtain a solution or suspension of at least one earth alkali hydrogen carbonate;

e) dosing the solution of at least one earth alkali hydrogen carbonate obtained in step d) from the first side process flow into the water provided in the main process flow to obtain an aqueous solution of at least one earth alkali hydrogen carbonate; and f) dosing an earth alkali hydroxide provided in water to the aqueous solution of at least one earth alkali hydrogen carbonate obtained in the main process flow of step e) to adjust the pH-value of the aqueous solution of at least one earth alkali hydrogen carbonate to a range from 7.0 to 9.0 and to form an aqueous solution of at least one earth alkali hydrogen carbonate having an earth alkali concentration as earth alkali hydrogen carbonate in the range from 10 to 300 mg/l;

wherein the molar ratio between the at least one earth alkali carbonate-comprising material in step b) and the earth alkali hydroxide in step f) is in the range from 50:1 to 1:10; and wherein the carbon dioxide concentration in the solution or suspension of at least one earth alkali hydrogen carbonate obtained in step d) is in the range from 50 to 2,800 mg/l, the carbon dioxide concentration in the aqueous solution of at least one earth alkali hydrogen carbonate obtained in step e) is in the range from 10 to 2,400 mg/l, and the carbon dioxide concentration in the aqueous solution of at least one earth alkali hydrogen carbonate obtained in step f) is in the range from 0.001 to 20 mg/l.

2. The process according to claim 1, wherein the at least one earth alkali carbonate-comprising material in step b) is selected from the group consisting of precipitated calcium carbonate, modified calcium carbonate, ground calcium carbonate, and any mixture thereof.

3. The process according to claim 1, wherein the at least one earth alkali carbonate-comprising material in step b) is selected from the group consisting of marble, limestone, chalk, and any mixture thereof.

4. The process according to claim 1, wherein the at least one earth alkali carbonate-comprising material in step b) is added in dry form or in aqueous form.

5. The process according to claim 1, wherein the at least one earth alkali hydrogen carbonate obtained in step d) comprises calcium hydrogen carbonate.

6. The process according to claim 1, wherein the earth alkali hydroxide added in step f) comprises calcium hydroxide.

7. The process according to claim 1, wherein the acid in step c) has a $pK_a$-value<4.

8. The process according to claim 1, wherein the acid in step c) is selected from the group consisting of sulphuric acid, hydrochloric acid, nitric acid, citric acid, and any mixture thereof.

9. The process according to claim 1, which further comprises subjecting the solution or suspension of at least one earth alkali hydrogen carbonate obtained in step d) to filtration through a filter, a membrane or a filter bed, or to centrifugation, before dosing the solution of at least one earth alkali hydrogen carbonate into the water in step e).

10. The process according to claim 1, wherein the pH-value in step c) is adjusted to the range from 3.0 to 7.0, and/or the pH-value in step e) is adjusted to the range from 5.5 to 7.5.

11. The process according to claim 1, wherein the aqueous solution of at least one earth alkali hydrogen carbonate obtained in step f) has an earth alkali concentration as earth alkali hydrogen carbonate in the range from 20 to 200 mg/l.

12. The process according to claim 1, wherein the molar ratio between the at least one earth alkali carbonate-comprising material in step b) and the earth alkali hydroxide in step f) is in the range from 50:1 to 1:3.

13. The process according to claim 1, wherein the suspension comprising the at least one earth alkali carbonate-comprising material obtained in step b) has a solids content in the range from 0.01 to 20.0 wt.-%, based on the total weight of the suspension.

14. The process according to claim 1, wherein the solution or suspension of at least one earth alkali hydrogen carbonate obtained in step d) has an earth alkali metal concentration as earth alkali hydrogen carbonate in the range from 100 to 1,000 mg/l.

15. The process according to claim 1, wherein the concentration of the earth alkali hydroxide in the water of step f) is in the range from 800 to 1,700 mg/l.

16. The process according to claim 1, wherein the earth alkali hydroxide is dosed in step f) from a tank.

17. The process according to claim 1, wherein the earth alkali hydroxide dosed in step f) is in form of a solution having an earth alkali hydroxide content from 0.05 wt.-% to 0.4 wt.-%, based on the total weight of the solution.

18. The process according to claim 1, wherein the earth alkali hydroxide dosed in step f) is in form of a suspension having an earth alkali hydroxide content from 15.0 to 25.0 wt.-%, based on the total weight of the suspension.

19. The process according to claim 1, wherein the earth alkali hydroxide dosed in step f) is provided from a second side process flow.

20. The process according to claim 1, wherein the aqueous solution of at least one earth alkali hydrogen carbonate obtained in step f) has a pH-value in the range from 7.2 to 8.9.

21. A process for the mineralization of water, the process comprises the steps of:

i) providing water to be mineralized, ii) preparing an aqueous solution comprising at least one earth alkali hydrogen carbonate by:

a) providing water in a main process flow and in a first side process flow;

b) adding at least one earth alkali carbonate-comprising material to the water provided in a first portion of the first side process flow to obtain a suspension comprising the at least one earth alkali carbonate-comprising material;

c) adding carbon dioxide or an acid having a $pK_a$-value<5 to the water provided in a second portion of the first side process flow and adjusting the pH-value to a range from 2.5 to 7.5 to obtain acidified water;

d) reacting the suspension obtained in step b) with the acidified water obtained in step c) in a reactor unit of the first side process flow to obtain a solution or suspension of at least one earth alkali hydrogen carbonate;

e) dosing the solution of at least one earth alkali hydrogen carbonate obtained in step d) from the first side process flow into the water provided in the main process flow to obtain an aqueous solution of at least one earth alkali hydrogen carbonate; and f) dosing an earth alkali hydroxide provided in water to the aqueous solution of at least one earth alkali hydrogen carbonate obtained in the main process flow of step e) to adjust the pH-value of the aqueous solution of at least one earth alkali hydrogen carbonate to a range from 7.0 to 9.0 and to form an aqueous solution of at least one earth alkali hydrogen carbonate having an earth alkali concentration as earth alkali hydrogen carbonate in the range from 10 to 300 mg/l;

wherein the molar ratio between the at least one earth alkali carbonate-comprising material in step b) and the earth alkali hydroxide in step f) is in the range from 50:1 to 1:10; and wherein the carbon dioxide concentration in the solution or suspension of at least one earth alkali hydrogen carbonate obtained in step d) is in the range from 50 to 2,800 mg/l, the carbon dioxide concentration in the aqueous solution of at least one earth alkali hydrogen carbonate obtained in step e) is in the range from 10 to 2,400 mg/l, and the carbon dioxide concentration in the aqueous solution of at least one earth alkali hydrogen carbonate obtained in step f) is in the range from 0.001 to 20 mg/l;

iii) combining the water to be mineralized of step i) and the aqueous solution comprising at least one earth alkali hydrogen carbonate of step ii) in order to obtain mineralized water, and iv) adding at least one earth alkali hydroxide to the mineralized water obtained in step iii).

22. The process according to claim 21, wherein the water in step i) is desalinated or naturally soft water.

23. A process for the preparation of an aqueous solution comprising at least one earth alkali hydrogen carbonate, comprising the steps of:

a) providing water in a main process flow and in a first side process flow;

b) adding at least one earth alkali carbonate-comprising material to the water provided in a first portion of the first side process flow to obtain a suspension comprising the at least one earth alkali carbonate-comprising material;

c) adding carbon dioxide or an acid having a $pK_a$-value<5 to the water provided in a second portion of the first side process flow and adjusting the pH-value to a range from 2.5 to 7.5 to obtain acidified water;

d) reacting the suspension obtained in step b) with the acidified water obtained in step c) in a reactor unit of the first side process flow to obtain a solution or suspension of at least one earth alkali hydrogen carbonate;

e) dosing the solution of at least one earth alkali hydrogen carbonate obtained in step d) from the first side process flow into the water provided in the main process flow to obtain an aqueous solution of at least one earth alkali hydrogen carbonate; and f) dosing an earth alkali hydroxide provided in water to the aqueous solution of at least one earth alkali hydrogen carbonate obtained in the main process flow of step e) to adjust the pH-value of the aqueous solution of at least one earth alkali hydrogen carbonate to a range from 7.0 to 9.0 and to form an aqueous solution of at least one earth alkali hydrogen carbonate having an earth alkali concentration as earth alkali hydrogen carbonate in the range from 10 to 300 mg/l;

wherein the molar ratio between the at least one earth alkali carbonate-comprising material in step b) and the earth alkali hydroxide in step f) is in the range from 50:1 to 1:10;

wherein the earth alkali hydroxide dosed in step f) is provided in a second side process flow; and wherein a second outlet of the second side process flow is connected to the main process flow at a location downstream of a connection of a first outlet of the first side process flow to the main process flow.

24. The process of claim 1, wherein the earth alkali hydroxide dosed in step f) is provided in a second side process flow; and wherein a second outlet of the second side process flow is connected to the main process flow at a location downstream of a connection of a first outlet of the first side process flow to the main process flow.

25. The process of claim 1, wherein the carbon dioxide concentration in the solution or suspension of at least one earth alkali hydrogen carbonate obtained in step d) is in the range from 200 to 750 mg/l, the carbon dioxide concentration in the aqueous solution of at least one earth alkali hydrogen carbonate obtained in step e) is in the range from 100 to 550 mg/l, and the carbon dioxide concentration in the aqueous solution of at least one earth alkali hydrogen carbonate obtained in step f) is in the range from 0.1 to 5 mg/l.

* * * * *